(12) United States Patent
Tsirkin

(10) Patent No.: US 9,323,563 B2
(45) Date of Patent: Apr. 26, 2016

(54) DETERMINING VIRTUAL MACHINE MIGRATION IN VIEW OF A MIGRATION RULE

(75) Inventor: Michael Tsirkin, Yokneam (IL)

(73) Assignee: Red Hat Israel, Ltd., Raanana (IL)

( * ) Notice: Subject to any disclaimer, the term of this patent is extended or adjusted under 35 U.S.C. 154(b) by 671 days.

(21) Appl. No.: 13/406,676

(22) Filed: Feb. 28, 2012

(65) Prior Publication Data

US 2013/0227551 A1 Aug. 29, 2013

(51) Int. Cl.
*G06F 9/455* (2006.01)
*G06F 9/48* (2006.01)

(52) U.S. Cl.
CPC .......... *G06F 9/45558* (2013.01); *G06F 9/4856* (2013.01); *G06F 9/4875* (2013.01); *G06F 2009/4557* (2013.01)

(58) Field of Classification Search
None
See application file for complete search history.

(56) References Cited

U.S. PATENT DOCUMENTS

| | | | | |
|---|---|---|---|---|
| 7,506,037 | B1 * | 3/2009 | Ciano et al. | 709/220 |
| 7,925,923 | B1 * | 4/2011 | Hyser et al. | 714/13 |
| 8,214,878 | B1 * | 7/2012 | Hernacki et al. | 726/1 |
| 8,285,817 | B1 * | 10/2012 | Balasubramanian et al. | 709/219 |
| 2008/0046960 | A1 * | 2/2008 | Bade | G06F 9/4856 726/1 |
| 2008/0172554 | A1 * | 7/2008 | Armstrong et al. | 713/2 |
| 2009/0070760 | A1 * | 3/2009 | Khatri et al. | 718/1 |
| 2011/0231839 | A1 * | 9/2011 | Bennett et al. | 718/1 |
| 2012/0054746 | A1 * | 3/2012 | Vaghani et al. | 718/1 |
| 2012/0198037 | A1 * | 8/2012 | Shelby et al. | 709/223 |
| 2013/0139155 | A1 * | 5/2013 | Shah | 718/1 |
| 2014/0019974 | A1 * | 1/2014 | Siu | G06F 9/4856 718/1 |

OTHER PUBLICATIONS

Definition of format com Dictionary.com; retrived on Jan. 16, 2014.*
Microsoft dictionary; Copyright 2002; p. 222.*

* cited by examiner

*Primary Examiner* — Abdullah Al Kawsar
(74) *Attorney, Agent, or Firm* — Lowenstein Sandler LLP

(57) ABSTRACT

Methods and systems for managing migration of a virtual machine from a source hypervisor to a destination hypervisor. A migration manager of the source hypervisor is provided which is configured to determine a state of the virtual machine and identify multiple state fields as either an optional field or an obligatory field. During restoration of the state by a migration manager of the destination hypervisor, the migration manager reviews the state fields and terminates the state restoration process if an obligatory field is encountered which is not recognized by the migration manager of the destination hypervisor. If during restoration, an optional field that is not recognized is encountered, the migration manager may choose to ignore the optional state field and proceed with the restoration process.

26 Claims, 3 Drawing Sheets

DETERMINING VIRTUAL MACHINE MIGRATION IN VIEW OF A MIGRATION RULE

TECHNICAL FIELD

Embodiments of the present invention relate to a computer system, and more specifically, to a migration of a virtual machine in a virtualized computing environment.

BACKGROUND

In computer science, a virtual machine (VM) is a portion of software that, when executed on appropriate hardware, creates an environment allowing the virtualization of an actual physical computer system. Each VM may function as a self-contained platform, running its own operating system (OS) and software applications (processes). Typically, a virtual machine monitor (VMM) or hypervisor manages allocation and virtualization of computer resources and performs context switching, as may be necessary, to cycle between various VMs.

Frequently, a guest running on a virtual machine should be migrated from a current hypervisor (i.e., the source hypervisor) to a different hypervisor (i.e., the destination hypervisor). For example, a virtual machine that is centrally hosted may require live migration or migration to a file for a variety of reasons, including load balancing on the host server, maintenance of the host server, upgrades of software and/or hardware of the host server, and so on. To perform the migration, the state of the guest executing on the source hypervisor should be realized and restored on the destination hypervisor.

Typically, to properly restore the state of the virtual machine during migration, the destination hypervisor is set up to be substantially identical to the source hypervisor. If the two hypervisors are configured in substantially the same way, then the state information of the virtual machine serialized by the source hypervisor may be loaded by destination hypervisor. However, this is problematic from a support perspective because advance knowledge of the migration and mirroring of the specific configurations of the source and destination hypervisors may not be possible.

This approach may be particularly problematic in cases where migration is desired from a new version of the hypervisor running on the source hypervisor to an old version of the hypervisor running on the destination hypervisor. Frequently, the new version of the hypervisor has been updated, modified, and or changed in order to support new functionality that is not supported by the old version. In such cases, when there is an attempted migration from the source hypervisor (running the new version) to the destination hypervisor (running the old version), the state information for the new functionality supported by the new version may be serialized by the source hypervisor, however, the old version running on the destination hypervisor may not expect the serialized state (since the functionality is not present in the old version), causing migration to fail.

In addition, bugs or problems may be detected in an old version of the hypervisor which are fixed in a new version of the hypervisor. However, this causes a disconnect during migration from the old version of the hypervisor (with the bug) to the new version of the hypervisor (without the bug) when restoring the state information of the virtual machine on the destination hypervisor. Specifically, when the old version migrates to a new version, it may include a corrupted state. For example, the old version may include a bug in a specific register supported by a CPU. When a guest reads that corrupted register, the guest receives incorrect values for the CPU and the guest crashes, while in a specific state. If migration were to occur, the specific state of the guest following the crash would be migrated to the new version of the hypervisor. As such, even if the new version fixed the register bug, the new version would receive the migrated state (i.e., the corrupted state) of the old version.

DETAILED DESCRIPTION

Figure 1:
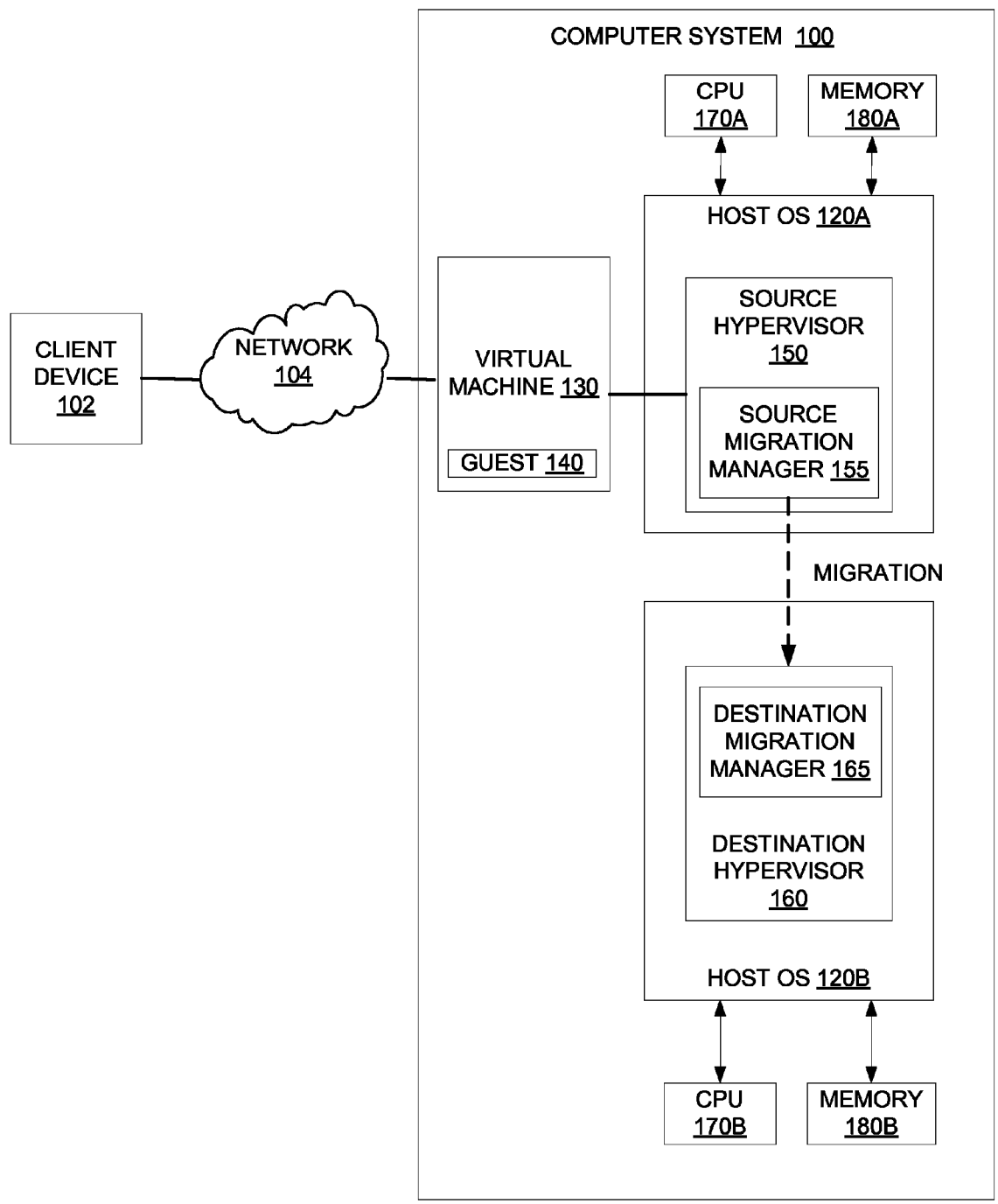
FIG. 1 is a block diagram of a virtual machine system illustrating a hypervisor migration environment, according to one embodiment of the invention.

Methods and systems for managing migration of a guest operating on a virtual machine from a source hypervisor to a destination hypervisor. In an embodiment, a migration manager is provided which is configured to manage the migration from the source hypervisor to the destination hypervisor. In an embodiment, the migration manager is a component of both the source hypervisor and the destination hypervisor.

Upon the triggering of a migration event, the migration manager of the source hypervisor may determine the state of the virtual machine. The state of the virtual machine may include multiple state fields (e.g., a feature or function of the virtual machine), which may each be identified and stored by the source hypervisor as either an optional field or an obligatory field. An optional field may be associated with a state field representing a feature or function which is identified as not required for operation of the virtual machine (i.e., the virtual machine could and would continue to function properly without the feature of function). An obligatory field may be associated with a state field representing a feature or function which is identified as required for operation of the virtual machine (i.e., the virtual machine would not continue to function properly without the feature of function). Accordingly, the state of the guest virtual machine may be encoded by the source hypervisor as a set of optional fields and a set of obligatory fields.

During migration, the destination hypervisor may restore the state of the virtual machine. In an embodiment, the set of obligatory fields and the set of optional fields are reviewed. If an obligatory field is encountered which is not recognized by the destination hypervisor, then the state load fails, and the migration is terminated. In the event that an optional field is encountered which is not recognized by the destination hypervisor, the destination hypervisor may skip the optional field and move to a next field for review as part of the state restoration process.

Throughout the following description, the term "guest" refers to the software that runs or can run on the hypervisor that is installed on a disk, loaded into memory, or currently running. A guest may include one or more of the following: a firmware copy in memory, an operating system, additional installed software, a browser, applications running on the browser, etc. The term "virtual machine" (VM) refers to part of a hypervisor that is visible to the guest. A virtual machine may include one or more of the following: memory, virtual CPU, virtual devices (e.g., emulated NIC or disk), physical devices over which a guest is given partial or full control, firmware such as Basic Input/Output System (BIOS), Extensible Firmware Interface (EFI) and Advanced Configuration and Power Interface (ACPI) which is provided to the guest, etc.

Accordingly, an efficient method and system is provided that optimizes the live migration or migration to a file of a virtual machine from a source hypervisor to a destination hypervisor. The representation of the state of the virtual machine as a set of optional fields and a set of obligatory fields allows a different version of the hypervisor to safely and efficiently load and execute the virtual machine. In addition, embodiments of the present invention advantageously allow for the detection of an unsafe migration and provide for the termination of the migration event in a graceful and controlled manner.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

FIG. 1 is a block diagram that illustrates an embodiment of a computer system 100 in which embodiments of the present invention may operate. Although, the computer system 100 may host multiple virtual machines (VM), a single virtual machine 130 is shown in FIG. 1 for purposes of illustration. The virtual machine 130 runs a guest (e.g., guest 140) that uses a guest operating system to manage its resources. The guest 140 may represent a client device 102 that accesses the computer system 100 via a network 104. In one embodiment, the computer system 100 is accessible by multiple remote systems via the network 104, which may be a private network (e.g., a local area network (LAN), a wide area network (WAN), intranet, etc.) or a public network (e.g., the Internet). The virtual machine 130 may run the same or different guest operating system, such as Microsoft Windows®, Linux®, Solaris®, Mac® OS, etc. The computer system 100 may be a server, a workstation, a personal computer (PC), a mobile phone, a palm-sized computing device, a personal digital assistant (PDA), etc.

In one embodiment, the computer system 100 runs a source hypervisor 150 to virtualize access to the underlying host hardware, making the use of the virtual machine 130 transparent to the guest 140 and the users of the computer system 100. Initially, as shown in FIG. 1, the virtual machine 130 running the guest 140 is managed by the source hypervisor 150. According to embodiments of the present invention, a process is provided wherein the virtual machine 130 is migrated from the source hypervisor 150 residing on a first host operating system (OS) 120A to a destination hypervisor 160 residing on a second host OS 120B. It is noted that in an alternative embodiment the source hypervisor 150 and the destination hypervisor 160 may reside on the same host OS.

The computer system 100 also includes hardware components such as one or more physical central processing units (CPUs) 170A, 170B, memory 180A, 180B, and other hardware components. In one embodiment, the source hypervisor 150 includes and the destination hypervisor 160 include a migration manager (155, 165). For the purposes of illustration, the source hypervisor's 150 migration manager is referred to as the "source migration manager 155" and the destination hypervisor's 160 migration manager is referred to as the "destination migration manager 165. It should be noted that the "source" and "destination" designations for the hypervisors and migration managers are provided for reference purposes in illustrating an exemplary implementation of the migration process according to embodiments of the present invention. It will be further appreciated that depending on the particulars of a given migration event, a hypervisor may at one time serve as the source hypervisor, while at another time the hypervisor may serve as the destination hypervisor.

The migration manager (155, 165) is a software component (i.e., a set of instructions executable by a processing device of the computer system 100, such as CPU 170) configured to perform the actions described in detail below with regard to FIG. 2. Although shown as discrete components of the source hypervisor 150 and the destination hypervisor 160, the migration manager may be a separate component externally coupled to both the source hypervisor 150 and the destination hypervisor 160.

In an embodiment, the migration may be from an old version of the hypervisor (i.e., the source hypervisor 150 runs the old hypervisor version) to a new (or newer) version of the hypervisor (i.e., the destination hypervisor 160 runs a new or newer version of the hypervisor). In another embodiment, the migration may be from a new (or newer) version of the hypervisor (i.e., the source hypervisor 150 runs the new or newer hypervisor version) to an old version of the hypervisor (i.e., the destination hypervisor 160 runs the old hypervisor version).

In an embodiment, a new version of the hypervisor may be encoded with a new feature or functionality which is designated as an optional field, in cases when it is known that the virtual machine 130 can operate properly without this functionality. For example, the new hypervisor version may include an updated clock feature which is capable of tracking time in microseconds (as compared to the old hypervisor version which includes a clock which tracks time in milliseconds). In this example, this clock state field may be designated as an optional field since the virtual machine can operate normally without this feature.

Upon the triggering of a migration event (i.e., the migration of the virtual machine 130 from the source hypervisor 150 to the destination hypervisor 160), the migration manager 155 of the source hypervisor 150 is configured to identify and record or facilitate storage of a state of the virtual machine including multiple state fields. The migration manager 155 records the state of the virtual machine as a set of optional fields and a set of obligatory fields. As denoted by the dashed line in FIG. 1, the migration process occurs, wherein the destination migration manager 165 of the destination manager 160 communicates with the source migration manager 155 of the source hypervisor 150 to restore the state of the virtual machine 130. In an embodiment, the destination migration manager 165 may use a network connection to receive the state recorded by the source migration manager 155.

For example, the source migration manager 155 may record each part of a state data structure using a notation (e.g., Abstract Syntax Notation One (ASN.1)) and an encoding format (e.g., Basic Encoding Rules (BER)). In this example, the destination migration manager 165 is configured to deserialize the notation and encoding used by the source migration manager 155. In an embodiment, the machine state can be specified as a set of individual device states, and the individual device states can be specified as a sequence of a set of obligatory fields followed by a set of optional fields. The migration process is described in detail below regard to FIG. 2.

Figure 2:
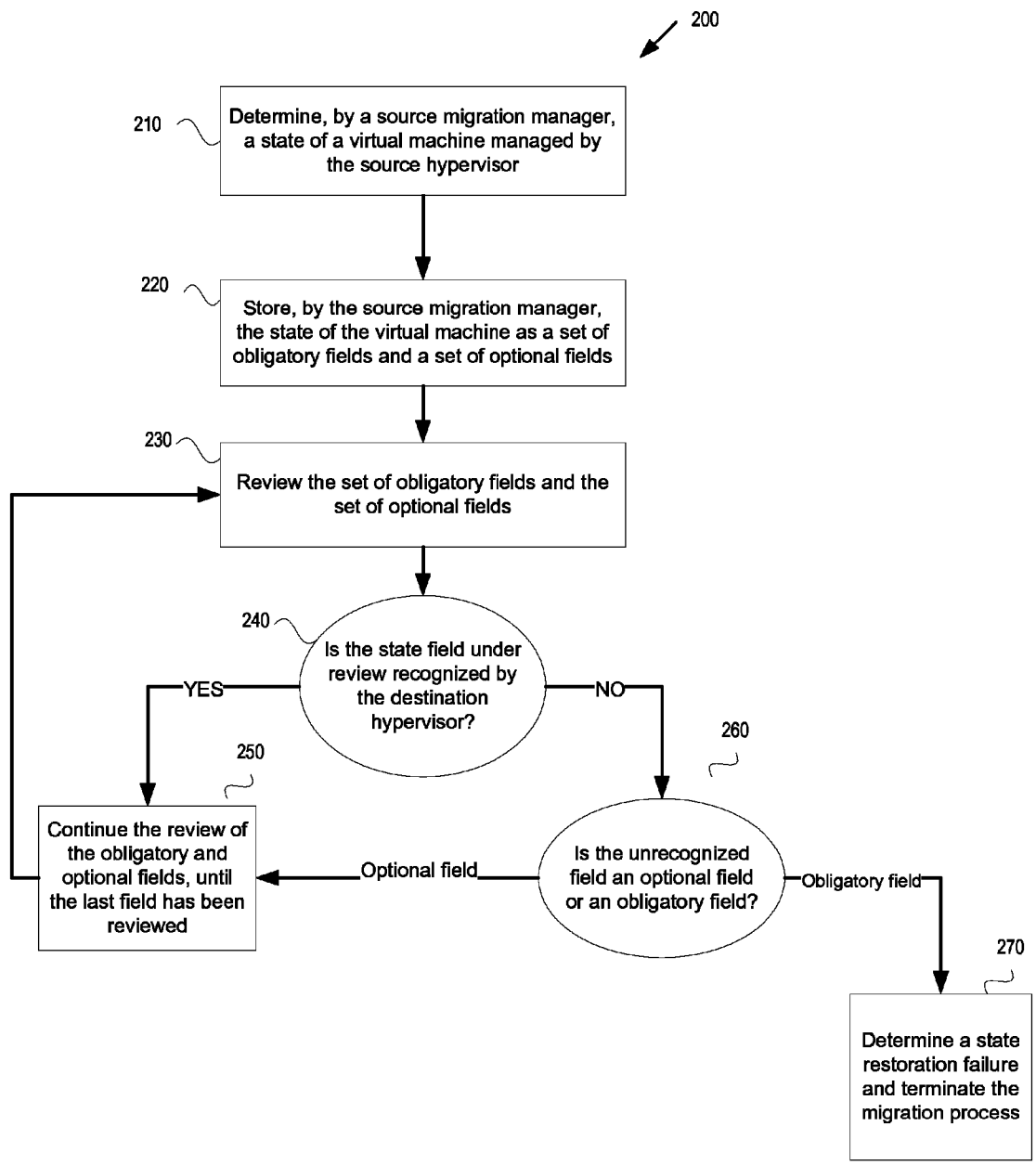
FIG. 2 is a flow diagram of one embodiment of a method for managing the migration of a guest virtual machine from a source hypervisor to a destination hypervisor, according to one embodiment of the invention.

FIG. 2 is a flow diagram illustrating one embodiment of a method 200 for managing the migration of a virtual machine (e.g., virtual machine 130 of FIG. 1) from a source hypervisor (e.g., source hypervisor 150 of FIG. 1) to a destination hypervisor (e.g., destination hypervisor 160 of FIG. 1). The method 200 may be performed by a computer system 300 of FIG. 3 that may comprise hardware (e.g., circuitry, dedicated logic, programmable logic, microcode, etc.), software (e.g., instructions run on a processing device), or a combination thereof. In one embodiment, the method 200 is performed by the source migration manager 155 and the destination migration manager 165 of FIG. 1.

Referring to FIG. 2, in one embodiment, the method 200 is initiated when a migration event is triggered calling for the migration of a virtual machine from a source hypervisor (i.e., the hypervisor currently executing the virtual machine) to a destination hypervisor. For example, a migration event may be triggered by a change in overhead of access to resources used by the virtual machine 130 (e.g., as a result of a failure in networking storage); a change in load placed on the host OS by other virtual machines; an increase in temperature of the host causing the host temperature to approach an allowable temperature limit; and/or a change in location of other virtual machines configured to perform functional failover or load-balancing with the given virtual machine 130 (e.g., wherein the failover virtual machines run in physically distant locations from the given virtual machine 130 in order reduce the chance of the virtual machines failing together). In block 210, the source migration manager determines a state of the virtual machine managed by the source hypervisor. The state of the virtual machine may include multiple state fields representative of various features or functions of the virtual machine, such as, for example, computing capacity, memory capacity, processing capacity, related device features, and/or any guest visible state (e.g., a MAC address programmed for a virtual network card, a current addressing mode of a VCPU (e.g., 64 bit, 32 bit), a current time for a virtual clock device). It should be noted that the source hypervisor may execute multiple virtual machines and, as such, the method 200 would be performed with respect to the multiple virtual machines. For purposes of illustration, method 200 is described with reference to an exemplary migration of a single virtual machine from a source hypervisor to a destination hypervisor.

Having determined the state of the virtual machine, the source migration manager reviews the multiple state fields and identifies and stores each state field in any suitable memory (e.g., memory 180A in FIG. 1) as either an optional field or an obligatory field, in block 220. An optional field is associated with a state field representing a feature or function which is not required for operation of the virtual machine (i.e., the virtual machine could and would continue to function properly without it). An exemplary optional field may include state information related to the virtual machine's suppression of interrupts to the guest, as an optimization. In this example, the failure to migrate this state would still permit the virtual machine to function, with higher overhead, while sending more unnecessary interrupts to the guest. Another example of an optional field may include state information relating to the current time for a clock device. In this example, the failure to migrate the current time for the clock device may cause the guest clock to show an incorrect value, but the guest would be able to recover by resetting the clock (e.g., using the Network Time Protocol (NTP)). Yet another example of an optional field may include state information relating to an entire device (i.e., an optional device), such as a graphical display. In this example, the guest may function properly as a networking server even if the optional device (and all related state information) is lost during migration and stops responding.

In an embodiment, an obligatory field is associated with a state field representing a feature or function which is required for operation of the virtual machine. Accordingly, the state of the virtual machine is serialized and encoded by the source hypervisor as a set of optional fields and a set of obligatory fields. Exemplary obligatory fields may include state information relating to a MAC address programmed for a virtual network card or a current addressing mode of the virtual CPU (e.g., 64 bit, 32 bit, 16 bit).

In block 230, the destination hypervisor attempts to restore the state of the virtual machine. In an embodiment, the destination migration manager communicates with the source migration manager to review the set of obligatory fields and the set of optional fields. In an embodiment, the fields may be reviewed in order, i.e., review field 1, review field 2, etc. In another embodiment, all of fields in the set of obligatory fields may be reviewed first, followed by a review of the fields in the set of optional fields. In another embodiment, the fields may be reviewed according to an order dictated and selected by the destination migration manager or the source migration manager based on the use of the identifiers associated with the respective fields.

As shown in FIG. 2, the destination migration manager determines if it recognizes the field under review, in block 240. In an embodiment, the destination migration manager maintains a list of valid fields that it expects to see during the migration process, and if the destination migration manager encounters a field that is not on the valid field list, then the encountered field is considered unrecognized by the destination migration manager. In an embodiment, the destination migration manager may also maintain a list of rules governing what is considered to be valid content for each field. If the destination migration manager recognizes the field, the destination migration manager moves to the next field and continues the review process, at block 250. In operation, the field review process may continue in this manner if no unrecognized fields are encountered until the last field has been reviewed.

In an embodiment, if the field under review has a name or a tag (i.e., an identifier) which is not known by the destination migration manager, it may be configured to treat the unknown field as an optional field (in block 260) during the state restoration process. According to another embodiment of the present invention, if the destination migration manager encounters a field having an identifier that is unknown, the destination migration manager may be configured to refer to one or more migration rules to determine if the field should be treated as unrecognized, in block 240. The migration rules may be configured to provide a check of the contents of a particular field, and may include rules relating to the type of field (e.g., a rule that a MAC address field be a 6 byte value, a rule that a CPU addressing mode field be an enumerated type with 3 legal values, a rule that a clock setting field be a string in a particular format, such as, HH:MM:SS) or require that the value of the field be within a particular range (e.g., a rule requiring that a memory field include a value that is within certain memory range) that must be satisfied in order for the field to be deemed recognized by the destination migration manager, in block 240. If the migration rule is not satisfied, the migration manager may treat the field as unrecognized. For example, the migration rule may provide that at least 1 GB of memory be available. In checking compliance with the rule, the destination migration manager may determine that a memory field indicates that greater than 1 GB is available, and as such, the field is considered recognized.

If the destination migration manager does not recognize the field under review, the method 200 moves to block 260. In block 260, the destination migration manager determines whether the unrecognized field is an optional field or an obligatory field. If the unrecognized field is an optional field, the method 200 continues to block 250, and the field review process proceeds.

In an embodiment, the destination hypervisor maintains a list of required fields (i.e., state fields that the destination hypervisor must encounter during migration) and compares the current state field under review (i.e., whether recognized or unrecognized in block 240) to the required fields list to determine if the field is required. In another embodiment, a rule governing whether a field is required may be dynamic or conditional. For example, a conditional rule may state that an MSI-X vector address is required only if another field is present indicating that the MSI-X mode is enabled. If the destination migration manager determines that the state field under review is required by the destination hypervisor, the destination migration manager determines that a state restoration failure has occurred and terminates the migration process, in block 270. In an embodiment, the destination migration manager may be configured to apply one or more migration rules to a field under review in order to determine if a state field is required by the destination hypervisor. In this regard, if the migration rule is not satisfied, then the state field is treated as required, and the migration process is terminated, in block 270.

If, in block 260, the destination migration manager determines that the unrecognized field is an obligatory field, then the destination migration manager determines that a state restoration failure has occurred and terminates the migration process, in block 270.

As illustrated in FIG. 2, in the event that the destination migration manager encounters no unrecognized fields or the only fields that are unrecognized are optional fields that are not required by the destination hypervisor, then the migration process successfully completes (i.e., the state restoration or loading process is successful).

In an embodiment, the system and method of the present invention may be used to break or prevent migration to an unsupported version of a hypervisor. According to this embodiment, an obligatory field may be added to each of the supported versions of the hypervisor. In operation, if an attempt is made to migrate from a supported version of the hypervisor to an unsupported version of the hypervisor, then the migration will fail due to the presence of the obligatory field in the supported version(s).

In an embodiment, the system and method of the present invention may be used to break or prevent migration from an unsupported version of a hypervisor. According to this embodiment, the unsupported hypervisor version may be configured to include an obligatory field. In operation, if an attempt is made to migrate from an unsupported version, the migration will fail due to the presence of the obligatory field in the unsupported version in block 260.

In an embodiment, the migration process may be performed when moving a virtual machine from a first host operating system running a new version of the hypervisor to a second host operating system which has not been updated to a new version of the hypervisor yet, thereby resulting in a migration from a newer version of the hypervisor to an older version of the hypervisor.

Figure 3:
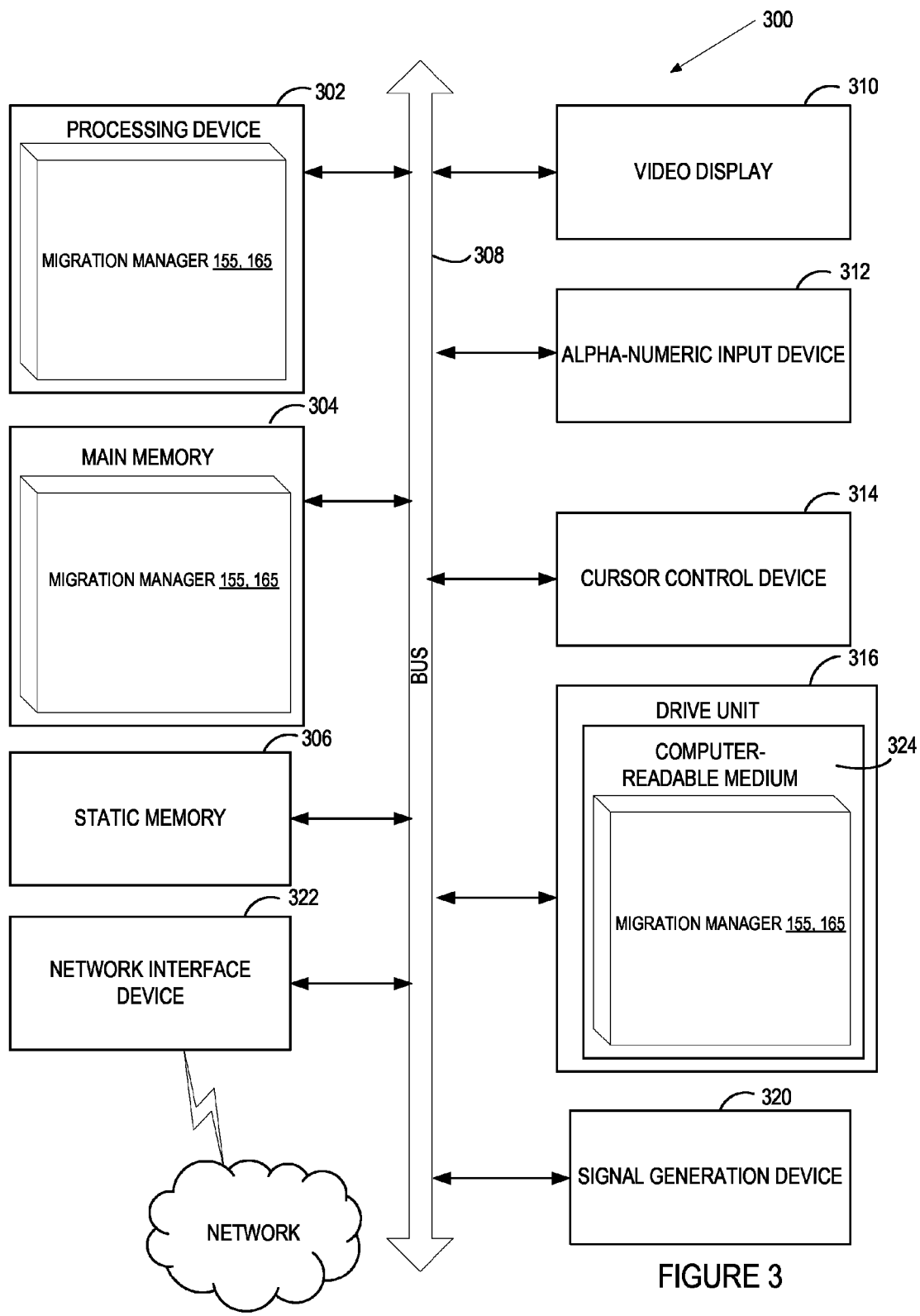
FIG. 3 illustrates a diagrammatic representation of an exemplary hypervisor migration management system.

FIG. 3 illustrates a diagrammatic representation of a machine in the exemplary form of a computer system 300 within which a set of instructions, for causing the machine to perform any one or more of the methodologies discussed herein, may be executed. In some embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 300 includes a processing device (processor) 302, a main memory 304 (e.g., read-only memory (ROM), flash memory, dynamic random access memory (DRAM) such as synchronous DRAM (SDRAM)), a static memory 306 (e.g., flash memory, static random access memory (SRAM)), and a data storage device 316, which communicate with each other via a bus 308.

Processing device 302 represents one or more general-purpose processing devices such as a microprocessor, central processing unit, or the like. More particularly, the processing device 302 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 302 may also be one or more special-purpose processing devices such as an application specific integrated circuit (ASIC), a field programmable gate array (FPGA), a digital signal processor (DSP), network processor, or the like. The migration manager 155, 165 in FIG. 1 may comprise processing 302 configured to perform the operations and steps discussed herein.

The computer system 300 may further include a network interface device 322. The computer system 300 also may include a video display unit 310 (e.g., a liquid crystal display (LCD) or a cathode ray tube (CRT)), an alphanumeric input device 312 (e.g., a keyboard), a cursor control device 314 (e.g., a mouse), and a signal generation device 320 (e.g., a speaker).

A drive unit 316 may include a computer-readable medium 324 on which is stored one or more sets of instructions (e.g., instructions of the migration manager 155, 165) embodying any one or more of the methodologies or functions described herein. The instructions of the migration manager 155, 165 may also reside, completely or at least partially, within the main memory 304 and/or within the processing device 302 during execution thereof by the computer system 300, the main memory 304 and the processing device 302 also constituting computer-readable media. The instructions of the migration manager 155, 165 may further be transmitted or received over a network via the network interface device 322.

While the computer-readable storage medium 324 is shown in an exemplary embodiment to be a single medium, the term "computer-readable storage medium" should be taken to include a single non-transitory medium or multiple non-transitory media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "determining", "storing", "identifying", "reviewing", "assigning", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   reviewing, by a destination migration manager of a destination hypervisor executed by a processing device, during migration of a virtual machine from a source hypervisor to the destination hypervisor, a state of the virtual machine comprising a plurality of state fields, wherein the source hypervisor identifies each of the plurality of state fields as one of an optional field or an obligatory field;
   determining, by the destination migration manager, a state field under review is unrecognized by applying a migration rule defining state fields recognized by the destination hypervisor;
   identifying, by the destination migration manager, the unrecognized state field under review as one of an optional field or an obligatory field in view of the identification by the source hypervisor; and
   determining, by the destination migration manager, a state restoration failure of the virtual machine, wherein the state restoration failure comprises termination of the migration in response to identifying the unrecognized state field under review as an obligatory field.

2. The method of claim 1, further comprising
   reviewing, by the destination migration manager, a next state field if the unrecognized state field under review is an optional field.

3. The method of claim 1, further comprising:
   identifying, by the destination migration manager, a first state field as required to operate the virtual machine; and
   determining, by the destination migration manager, a state restoration failure if the first state field is not encountered by the destination migration manager.

4. The method of claim 1, wherein the migration rule comprises a rule to determine if an identifier associated with the state field under review is recognized by the destination migration manager.

5. The method of claim 1, wherein the obligatory field represents functionality that is identified as required to operate the virtual machine.

6. The method of claim 1, wherein the optional field represents functionality that is identified as not required to operate the virtual machine.

7. The method of claim 1, wherein the source hypervisor comprises an old hypervisor version, and a source migration manager of the source hypervisor stores a state field as an obligatory field that is unrecognized by the destination migration manager.

8. The method of claim 1, wherein a source migration manager of the source hypervisor encodes each of the plurality of state fields as one of an optional field or an obligatory field.

9. The method of claim 1, wherein the state of the virtual machine is serialized in an Abstract Syntax Notation One notation.

10. The method of claim 9, wherein the Abstract Syntax Notation One notation is encoded using a Basic Encoding Rules format.

11. A non-transitory computer readable storage medium comprising instructions that, when executed by a processing device, cause the processing device to:

review, by a destination migration manager of a destination hypervisor executed by a processing device, during migration of a virtual machine from a source hypervisor to the destination hypervisor, a state of the virtual machine comprising a plurality of state fields, wherein the source hypervisor identifies each of the plurality of state fields as one of an optional field or an obligatory field;

determine, by the destination migration manager, a state field under review is unrecognized by applying a migration rule defining state fields recognized by the destination hypervisor;

identify, by the destination migration manager, the unrecognized state field under review as one of an optional field or an obligatory field in view of the identification by the source hypervisor; and determine, by the destination migration manager, a state restoration failure of the virtual machine, wherein the state restoration failure comprises termination of the migration in response to identifying the unrecognized state field under review as an obligatory field.

12. The non-transitory computer readable storage medium of claim 11, the processing device to review a next state field if the state field under review is an optional field.

13. The non-transitory computer readable storage medium of claim 11, the processing device to:
identify a first state field as required to operate the virtual machine; and
determine a state restoration failure if the first state field is not encountered by the destination migration manager.

14. The non-transitory computer readable storage medium of claim 11, wherein the migration rule comprises a rule to determine if an identifier associated with the state field under review is recognized by the destination migration manager.

15. The non-transitory computer readable storage medium of claim 11, wherein the obligatory field represents functionality that is identified as required for operation of the virtual machine.

16. The non-transitory computer readable storage medium of claim 11, wherein the optional field represents functionality that is identified as not required for operation of the virtual machine.

17. The non-transitory computer readable storage medium of claim 11, wherein the source hypervisor comprises an old hypervisor version, and a source migration manager of the source hypervisor to store a state field as an obligatory field that is unrecognized by the destination migration manager.

18. The non-transitory computer readable storage medium of claim 11, wherein a source migration manager of the source hypervisor to encode each of the plurality of state fields as one of an optional field or an obligatory field.

19. The non-transitory computer readable storage medium of claim 11, wherein the state of the virtual machine is serialized in an Abstract Syntax Notation One notation.

20. The non-transitory computer readable storage medium of claim 19, wherein a source migration manager of the source hypervisor to encode the Abstract Syntax Notation One notation using a Basic Encoding Rules format.

21. A computer system comprising:
a memory configured to store instructions; and
a processing device operatively coupled to the memory, wherein the processing device executes the instructions to:
review by a destination migration manager of a destination hypervisor executed by the processing device, during migration of a virtual machine from a source hypervisor to the destination hypervisor, a state of the virtual machine comprising a plurality of state fields, wherein the source hypervisor identifies each of the plurality of state fields as one of an optional field or an obligatory field;
determine, by the destination migration manager, a state field under review is unrecognized by applying a migration rule defining state fields accepted by the destination hypervisor; and
identify, by the destination migration manager, the unrecognized state field under review as one of an optional field or an obligatory field in view of the identification by the source hypervisor;
determine, by the destination migration manager, a state restoration failure of the virtual machine, wherein the state restoration failure comprises termination of the migration in response to identifying a state field under review as an obligatory field.

22. The computer system of claim 21, the processing device to review a next state field if the state field under review is an optional field.

23. The computer system of claim 21, the processing device to:
identify a first state field as required to operate the virtual machine; and
determine a state restoration failure.

24. The computer system of claim 21, wherein the migration rule comprises a rule to determine if an identifier associated with the state field under review is not recognized by the destination migration manager.

25. The computer system of claim 21, wherein the obligatory field represents functionality that is identified as required for operation of the virtual machine.

26. The computer system of claim 21, wherein the optional field represents functionality that is identified as not required for operation of the virtual machine.

* * * * *